US008287788B2

(12) United States Patent
Scholz et al.

(10) Patent No.: US 8,287,788 B2
(45) Date of Patent: Oct. 16, 2012

(54) METHOD FOR THE CONTINUOUS PRODUCTION OF THERMOPLASTICALLY-PROCESSABLE POLYURETHANE ELASTOMERS

(75) Inventors: Guenter Scholz, Lemfoerde (DE); Marian Mours, Weisenheim (DE); Sven Lawrenz, Mannheim (DE); Horst Papenfuss, Stemwede-Haldem (DE); Christoph Bahr, Lembruch (DE); Ruediger Krech, Diepholz (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1018 days.

(21) Appl. No.: 11/815,221

(22) PCT Filed: Jan. 31, 2006

(86) PCT No.: PCT/EP2006/050550
§ 371 (c)(1),
(2), (4) Date: Aug. 1, 2007

(87) PCT Pub. No.: WO2006/082183
PCT Pub. Date: Aug. 10, 2006

(65) Prior Publication Data
US 2008/0139776 A1 Jun. 12, 2008

(30) Foreign Application Priority Data
Feb. 3, 2005 (DE) .......................... 10 2005 004 967

(51) Int. Cl.
*B29C 47/78* (2006.01)
*C08G 18/00* (2006.01)
(52) U.S. Cl. ........... 264/211.24; 264/176.1; 264/211.23; 425/133.5; 528/76; 528/77; 528/80; 528/81; 528/84; 528/85

(58) Field of Classification Search ................. 528/76, 528/77, 80, 81, 84, 85; 425/133.5; 264/176.1, 264/211.23, 211.24
See application file for complete search history.

(56) References Cited

U.S. PATENT DOCUMENTS

| 3,642,964 | A | * | 2/1972 | Rausch ...................... 264/40.6 |
| 3,963,679 | A | * | 6/1976 | Ullrich et al. ................. 528/45 |
| 4,245,081 | A | * | 1/1981 | Quiring et al. ................. 528/65 |
| 5,621,024 | A | * | 4/1997 | Eberhardt et al. ............ 523/324 |

FOREIGN PATENT DOCUMENTS

| DE | 2 302 564 | 7/1974 |
| DE | 44 37 586 | 4/1996 |
| DE | 199 24 089 | 1/2001 |
| DE | 199 24 090 | 1/2001 |
| WO | 91 00304 | 1/1991 |

OTHER PUBLICATIONS

Barth, "Kontinuierliche Herstellung Massiver Polyurethanprodukte", Plastverarbeiter, vol. 40, No. 1 pp. 100-106, XP000080358, 1989.

* cited by examiner

*Primary Examiner* — Randy Gulakowski
*Assistant Examiner* — Michael L Leonard
(74) *Attorney, Agent, or Firm* — Oblon, Spivak, McClelland, Maier & Neustadt, L.L.P.

(57) ABSTRACT

The present invention relates to a process for the continuous production of thermoplastically processable polyurethane elastomers, by metering a polyisocyanate (A), a proportion of 1-80 equivalent%, based on the isocyanate group content of the polyisocyanate (A), of a compound (B) having an average of at 1.8-3.0 hydrogen atoms having Zerewitinoff activity, with an average molar mass of 450-5000 g/mol, and a proportion of 12-99 equivalent%, based on the isocyanate group content of the polyisocyanate (A), of a chain extender (C), into a self-cleaning twin-screw extruder whose diameter is 32-62 mm, which is operated at shear rates above 6000 $s^{-1}$ and residence times of 1-20 seconds, and then bringing the mixture from the self-cleaning twin-screw extruder into a second apparatus in order to complete the reaction.

17 Claims, No Drawings

METHOD FOR THE CONTINUOUS PRODUCTION OF THERMOPLASTICALLY-PROCESSABLE POLYURETHANE ELASTOMERS

This application is the U.S. national stage entry of PCT application EP06/050550 filed on Jan. 31, 2006, and claims foreign priority to German application 102005004967.2 filed on Feb. 3, 2005.

The invention relates to a process for continuous production of thermoplastically processable polyurethane elastomers with improved homogeneity.

Thermoplastically processable polyurethane elastomers (TPUs) have been known for a relatively long time. Their excellent physico-mechanical properties and good chemical properties, which can be adjusted within a wide range via suitable selection of the starting components and their stoichiometric ratios, and also of the preparation conditions, have strengthened their position in recent years among the high-specification thermoplastically processable elastomer plastics.

TPUs are produced by a polyaddition mechanism from substantially linear components having terminal groups reactive toward isocyanate, in particular OH groups, i.e. dihydric polyether or polyester alcohols, and from difunctional isocyanates, and also from short-chain difunctional chain extenders, in particular alcohols, with addition of auxiliaries and stabilizers, taking into account the tailored properties acquired by the final product. The best-known preparation processes are the one-shot process and the prepolymer process. In the one-shot process, all of the components are reacted with one another in a single step, whereas the prepolymer process generally begins with formation of a precursor comprising isocyanate groups (the prepolymer) from the starting components of isocyanate and macrodiol, the precursor then being reacted immediately or subsequently in a second step of the process with the chain extender to give the final product.

The continuous production processes predominant for industrial production purposes are the belt process or the reactive extruder process. The resultant TPUs are then generally further processed by the two best-known thermoplastic processing methods: injection molding or extrusion, and shaping by extrusion to give tubular items and foils places the highest demands here on the quality of the TPU material. The cause of this is firstly that, because the shear forces introduced are lower in comparison with injection molding, dispersion performance is poorer, the result being inadequately dispersed inhomogeneous regions which have higher melting point than the product matrix and which, because their refractive indices differ from that of the product matrix, are noticeably visible. Secondly, the continuous process of extrusion processing places extreme requirements upon the constancy of melt viscosity of the TPUs within the processing temperature range.

The materials tests for assessment of product homogeneity of TPUs, using internal standards, are therefore based not only on visual detection of inhomogeneous regions sharply demarcated spatially, or by color, these being known as specks or burn marks, but also on inhomogeneous regions without any visible demarcation from the matrix, these being discernible as streaks in transparent TPU extrudates and being attributed to an inhomogeneously dispersed product with markedly different viscosity of material.

DE-C 199 24 089 proposes a one-shot metering process for production of homogeneous TPUs with improved softening performance, by first mixing the entire TPU reaction mixture, comprising polyisocyanate, polyol, and chain extender homogeneously in a static mixer at high shear rates of from 500 to 50 000 $s^{-1}$ at defined temperatures within very short mixing times of at most 1 s, and metering the resultant reaction mixture into an extruder, if appropriate by way of a second static mixer.

DE-A 199 24 090 has the same process objective, production of TPUs with improved softening performance, and forms the reaction mixture in a stirred tubular reactor with defined ratios of stirring velocity and throughput, and then completes formation of the TPU in an extruder.

Both processes serve particularly for production of homogeneous TPU grades with lowered softening point.

A substantial disadvantage of both processes is the lack of self-cleaning of the mixing apparatus (static mixer and stirred tubular reactor, respectively), contrasting with a tightly intermeshing twin-screw extruder. The process therefore produces product deposits in dead zones, and these cause narrowing and finally closure of the free flow cross section of the static mixer or of the tubular reactor, and restrict the stability and also the continuity of the production process. Furthermore, the very short mixing and residence times, in particular in the reaction premixing with the aid of the static mixer, favor mixtures in the subsequent final product in the extruder, with adverse consequences in particular for homogeneity of material.

DE-A 2 203 564 proposes using a combination of a self-cleaning twin-screw extruder with a single-screw extruder immediately downstream to separate the mixing process from formation of polymer under non-aggressive conditions, in order to eliminate overheating of the finished product. In order to achieve a homogeneous final product free from small regions of non-uniformity, the critical reaction phase in which the reaction mixture has high tack and has a viscosity in the range from about 200 to 700 poise is to be passed within a screw zone composed of kneading elements at kneading frequencies of up to 15 Hz and with a velocity gradient of more than 2000 $s^{-1}$ in the radial clearance between flight land and barrel wall. By way of example, a value of 4170 $s^{-1}$ in the radial clearance is stated as maximum velocity gradient in the sheared product.

However, it has been found in practice that these operating conditions, i.e. a maximum velocity gradient of about 4170 $s^{-1}$, cannot give long-term stability of production of homogeneous products free from small regions of non-uniformity.

It was therefore an object of the invention to provide a continuous process which is consistent and has low maintenance requirement and which is substantially insensitive to reactivity variations in the raw materials used, and which can produce homogeneous products free from small regions of non-uniformity.

This object is achieved via a process for continuous production of thermo-plastically processable polyurethane elastomers with improved homogeneity, by metering a polyisocyanate (A),
a proportion of from 1 to 80 equivalent %, based on the isocyanate group content of the polyisocyanate (A), of a compound (B) having an average of at least 1.8 and at most 3.0 hydrogen atoms having Zerewitinoff activity, with an average molar mass of from 450 g/mol to 5000 g/mol,
a proportion of from 12 to 99 equivalent %, based on the isocyanate group content of the polyisocyanate (A), of a chain extender (C) having an average of at least 1.8 and at most 3.0 hydrogen atoms having Zerewitinoff activity per molecule, with an average molar mass of from 60 g/mol to 400 g/mol, from 0 to 30% by weight, based on the total amount of the polyurethane elastomer, of catalysts and further auxiliaries and additives (D), the molar NCO:OH ratio of polyisocyanate (A) to the entirety composed of the compound (B), of the chain extender (C), and of the further auxiliaries and additives (D) being from 0.9:1 to 1.2:1 into a self-cleaning twin-screw extruder which is operated at high shear rates, and then bringing the mixture from the self-cleaning twin-screw extruder into a further apparatus in order to complete the reaction, which comprises setting shear rates above 6000 s$^{-1}$ and residence times in the range from 1 to 20 s in the self-cleaning twin-screw extruder.

It has been found that product homogeneity can be decisively improved via separation of mixing procedure from molecular-weight increase in the production of the TPUs, with use of different extruders for these respective processes, carrying out the mixing procedure with very high shear rates and short residence times.

There is no restriction on the invention in relation to the polyisocyanates that can be used. The polyisocyanate used here is either a single substance or else a mixture of substances, preferably selected from the following list: diphenylmethane 4,4'-diisocyanate with at least 97% 4,4'-isomer content, hexamethylene 1,6-diisocyanate, dicyclohexylmethane diisocyanate, and isophorone diisocyanate.

The compound having an average of at least 1.8 and at most 3.0 hydrogen atoms having Zerewitinoff activity is likewise the substantially linear substances conventional in polyurethane chemistry and reactive toward isocyanate, or a mixture thereof. Particular conventional groups reactive toward isocyanates are hydroxy groups, and also amino groups, mercapto groups, or carboxylic acid groups. The compounds here are preferably polyesterols, polyetherols, or polycarbonatediols.

The average molar mass of the long-chain compounds having hydrogen atoms having Zerewitinoff activity is from 450 g/mol to 5000 g/mol, and the proportion used of these compounds is from 1 to 80 equivalent %, based on the isocyanate group content of the polyisocyanate.

A third starting material for the TPUs is a proportion of from 12 to 99 equivalent %, based on the isocyanate group content of the polyisocyanate, of a chain extender (C) having an average of at least 1.8 and at most 3.0 hydrogen atoms having Zerewitinoff activity per molecule, with an average molar mass of from 60 g/mol to 400 g/mol. The chain extender is preferably a substance or a mixture of substances selected from the following list: ethanediol, propanediol, 1,4-butanediol, 1,6-hexanediol, and 1,4-di(β-hydroxyethyl)hydroquinone.

Suitable catalysts and conventional auxiliaries and additives, etc. can also be used. Among suitable catalysts are organometallic compounds, such as titanic esters, iron compounds, tin compounds, e.g. stannous diacetate, stannous dioctoate, stannous dilaurate, dibutyltin diacetate, and dibutyltin dilaurate. Examples of conventional auxiliaries and additives are plasticizers, lubricants, molecular weight regulators, flame retardants, inorganic/organic fillers, dyes, pigments, and stabilizers with respect to hydrolysis, light, and thermal degradation.

The amounts used of the polyisocyanate, of the long-chain compound having hydrogen atoms having Zerewitinoff activity, and of the chain extender are mutually balanced in such a way that the molar NCO:OH ratio derived from the polyisocyanate with respect to the entirety of the long-chain compound having hydrogen atoms having Zerewitinoff activity, chain extender and, if appropriate, the auxiliaries and additives is from 0.9:1 to 1.2:1.

The starting mixture is metered into a self-cleaning twin-screw extruder which is operated at high shear rates, and the mixture is then brought from the self-cleaning twin-screw extruder into a further apparatus to complete the reaction.

Twin-screw extruders which can be used are in principle any of the machines which can provide the velocity gradient of at least 6000 s$^{-1}$ demanded. These are generally machines whose two screws co-rotate. In particular, the screw clearance, i.e. the distance between screw flight land and the inner wall of the extruder barrel, particularly has to be in the range from about 0.2 to 0.5 mm. By virtue of the narrow screw clearance, the corresponding machines are small-volume machines, implying restricted throughput of material through the machine.

It is preferable to select self-cleaning twin-screw extruders whose diameter is in the range from 32 to 62 mm. Further preference is given to self-cleaning twin-screw extruders whose L/D ratio, i.e. ratio of screw length to screw diameter, is at least 8.

The mixing sections of the extruder screw advantageously occupy from 5/100 to 25/100 of the entire length of the extruder screw in the self-cleaning twin-screw extruder.

By way of example, ZSK 43 Mv twin-screw extruders from Werner & Pfleiderer, Stuttgart are particularly suitable.

The velocity gradient (synonym: shear rate) in an extruder is defined by the following equation:

$$\text{velocity gradient (1/s)} = 2 \cdot \pi \cdot \text{rotation rate (1/s)} \cdot \text{radius circumscribed by screw (mm)/radial clearance (mm)}$$

The radius circumscribed by the screw here is half of the external diameter of the screw. By way of example, the external diameter of the screw is 42 mm for the ZSK 43 Mv extruder from Werner & Pfleiderer, Stuttgart.

The radial clearance or the gap width is the distance between screw flight land and inner wall of the barrel of the extruder. The radial clearance is 0.25 mm for the abovementioned ZSK 43 Mv extruder.

The reaction mixture is brought from the self-cleaning twin-screw extruder into a further apparatus to complete the reaction. This can preferably be a twin-screw extruder with low shear rates, a continuously revolving, heatable conveyor belt, or else a single-screw extruder.

Low shear rates here mainly mean shear rates substantially below those in the first self-cleaning twin-screw extruder, in particular in the range from 800 s$^{-1}$ to 3200 s$^{-1}$, preferably from 1200 to 2400 s$^{-1}$.

Extruders which may in particular be used here have a radial clearance in the range from 0.5 to 1.4 mm, preferably from 0.6 to 1.1 mm. These are high-volume extruders, meaning that the throughput of material is substantially greater when comparison is made with the twin-screw extruders described for the first stage of the process.

By way of example, a ZSK 92 Mc twin-screw extruder from Werner & Pfleiderer, Stuttgart can be used, having an external screw diameter of 91.8 mm and a radial clearance of 0.6 mm.

In one embodiment of the process, the polyisocyanate, the long-chain compound having hydrogen atoms having Zerewitinoff activity, and the chain extender and, if appropriate, the catalysts, and the further auxiliaries and additives (D) are metered together into a first feed section of the twin-screw extruder operated with high shear rates.

As an alternative, it is also possible to premix the long-chain compound having hydrogen atoms having Zerewitinoff activity and the chain extender prior to metering into the feed section of the self-cleaning twin-screw extruder, in particular by means of a static mixer or of a mixing head operating by the dynamic mixing principle.

As an alternative, it is also possible to meter the polyisocyanate and the long-chain compound having hydrogen atoms having Zerewitinoff activity into a first feed section of the twin-screw extruder operated with high shear rate, and to meter the chain extender into a further feed section of the same, situated downstream.

The TPUs obtained by the inventive process can in particular be used for production of injection-molded parts or of extrusion items.

The inventive process provides TPUs with excellent homogeneity, i.e. TPUs free from streaks and from small regions of non-uniformity.

The process is a consistent process and has low maintenance requirement, and in particular no deposits form in the twin-screw extruder operated with high shear rates. Furthermore, the intensive premixing at high shear gradients accelerates progress of the reaction and thus achieves an increase in throughput. The process is substantially insensitive to reactivity variations in the raw materials used.

The invention is described in more detail below, using inventive examples.

EXAMPLES 1 TO 4

Examples 1 to 4 used the mixing specification below, each of the components being stated in parts by weight:

| | |
|---|---|
| Diphenylmethane 4,4'-diisocyanate (polyisocyanate A) | 26.00 |
| Polybutanediol 1,4-adipate, molar mass about 2450 g/mol (compound B) | 66.66 |
| 1,4-Butanediol (chain extender C) | 6.80 |
| Elastostab ® HO1 from Elastogran (hydrolysis stabilizer D) | 0.53 |
| Stannous dioctoate (catalyst) | 10 ppm |

0.05% by weight of ethylenebisstearylamide, based on the total weight of the TPU pellets, was admixed in powder form as anticaking aid with the TPU pellets.

EXAMPLE 1

Non-Inventive

A mixture composed of the compound B, of the chain extender C, of the hydrolysis stabilizer D, and of the catalyst was fed, preheated to 150° C., into the first barrel section of a ZSK 92 twin-screw extruder from Werner & Pfleiderer, Stuttgart with screw length 48 D and with radial screw clearance of 0.6 mm, and, separately from this, the polyisocyanate A was fed, preheated to 65° C., into the first barrel section of the same extruder. The rotation rate of the twin-screw system was 280 rpm. The temperature settings for the barrel sections were, in the direction of flow, 200° C. in the first third of the screw, 170° C. in the second third of the screw, and 190° C. in the final third of the screw. The output was 850 kg/h.

Following underwater pelletization of the melt and integrated centrifugal drying, the pellets were finally dried at from about 80 to 90° C. and then further processed via injection molding to give test specimens. Round tubes were also extruded from the pellets in order to assess homogeneity.

EXAMPLE 2

Inventive

Unlike example 1, the process was carried out with the same mixing specification in an apparatus comprising a first small-volume, high-rotation-rate ZSK 43 Mv twin-screw extruder from Werner & Pfleiderer, Stuttgart, the left-hand side of whose first barrel section had been connected downstream of the ZSK 92 twin-screw extruder from Werner & Pfleiderer described in example 1.

The rotation rate of the ZSK 43 twin-screw extruder was 1000 rpm, and mixing sections occupied about 7% of the length of its twin-screw system. The temperature settings for barrel sections 1 to 12 of the ZSK 43 twin-screw extruder were 210° C. throughout. The settings for the screw rotation rate and the barrel section temperatures of the ZSK 92 twin-screw extruder were the same as the values stated in example 1. Throughput, pelletization, and pellet treatment were likewise the same as in example 1.

EXAMPLE 3

Inventive

The procedure was the same as in example 2, but unlike in that example using an increased screw rotation rate of 1500 rpm for the ZSK 43 Mv twin-screw extruder and an increased throughput of 1000 kg/h.

EXAMPLE 4

Inventive

The procedure was analogous to that of example 2, but unlike in that example using a screw rotation rate of 700 rpm for the ZSK 43 Mv twin-screw extruder.

EXAMPLES 5 AND 6

Examples 5 and 6 used the mixing specification below, each of the components of the raw materials mixture being stated in parts by weight:

| | |
|---|---|
| Diphenylmethane 4,4'-diisocyanate (polyisocyanate A) | 36.17 |
| Polytetramethylene glycol, molar mass about 1000 g/mol (compound B) | 55.81 |
| 1,4-Butanediol (chain extender C) | 8.02 |
| Tetrabutyl orthotitanate (catalyst) | 7.5 ppm |

EXAMPLE 5

Non-Inventive

The apparatus the same as in examples 2 to 4, i.e. a small-volume ZSK 43 Mv twin-screw extruder was used and had been connected to a large-volume ZSK 92 twin-screw extruder. A mixture composed of the compound B, of the chain extender, and of the catalyst, and, separately from this, the polyisocyanate A, were metered at 140° C. into the first barrel section of the ZSK 43 Mv twin-screw extruder. The rotational rate of the twin-screw system of the ZSK 43 Mv twin-screw extruder was 600 rpm. The temperature settings for barrel sections 1 to 12 of the twin-screw extruder were 20° C. throughout. The setting for the screw rotation rate in the large-volume ZSK 92 twin-screw extruder was 250 rpm, and the temperature settings for the barrel sections were 190° C. in the first third of the screw, 160° C. in the second third of the screw, and 180° C. in the final third of the screw. Throughput was 700 kg/h. Pelletization and treatment of pellets took place as in example 1.

EXAMPLE 6

Inventive

The process was carried out analogously to example 5, except that the screw rotation rate of the small-volume twin-screw extruder had been increased to 900 rpm.

EXAMPLE 7

Inventive

The following mixing specification was used, each of the components of the raw materials mixture being stated in parts by weight:

| | |
|---|---|
| Poly(1,4-butanediol/1,6-hexanediol) adipate, Molar mass about 2200 g/mol (compound B) | 70.75 |
| Hexamethylene diisocyanate (polyisocyanate A) | 18.80 |
| 1,6-Hexanediol (chain extender C) | 9.36 |
| n-Octanol (chain regulator D 1) | 0.46 |
| Elastostab ® HO1 from Elastogran (hydrolysis stabilizer D 2) | 0.58 |
| Stannous dioctoate (catalyst) | 0.05 |

A mixture heated to 160° C. and composed of compound B, of the n-octanol, of the catalyst, and of the hydrolysis stabilizer, and, separately from this, the polyisocyanate A were conveyed into the first barrel section of the small-volume ZSK 43 Mv twin-screw extruder which, as described in example 2, had been connected to the large-volume ZSK 92 twin-screw extruder. In contrast, the chain extender 1,6-hexanediol was fed into barrel section 8, situated downstream in the ZSK 43 Mv. The screw rotation rate was set at 750 rpm for the ZSK 43 and to 160 rpm for the ZSK 92. Pelletization and further treatment of pellets took place analogously to example 1.

Evaluation of homogeneity and content of specks (small regions of non-uniformity) in the TPUs obtained in examples 1 to 7.

For evaluation, the material was extruded from the corresponding TPU pellets in a PLE 331 Extrusiograph from Brabender using a screw whose root diameter progressively increases (1:2) and using a grooved feed end, the screw rotation rate being 30 rpm, to give tube profiles by way of a tube die head with external diameter 9.5 mm and internal diameter 6.3 mm.

The temperature settings in the Extrusiograph were:
zone 1 180° C., zone 2 190° C., zone 3 200° C., measuring ring 190° C., and profile head 200° C.

Homogeneity and speck content were assessed visually. For this, the round tube was compared with reference samples. The tube quality defined here as speck-free, with approval for extrusion processing, was a quality having at most two specks (small regions of non-uniformity) with maximum diameter 0.5 mm over 1 m of tube length.

The table below collates the experimental results from examples 1 to 7:

| Example | Mixing assembly (sole or first extruder) | Screw rotation rate in mixing assembly (rpm) | Shear gradient in mixing assembly Calculated (1/s) | Residence time in mixing assembly | Homogeneity | Approval for extrusion |
|---|---|---|---|---|---|---|
| Comparison | ZSK 92 | 280 | 2247 | 26 | many streaks and specks | not approved |
| 2 | ZSK 43 Mv | 1000 | 8792 | 5.7 | no streaks or specks | approved |
| 3 | ZSK 43 Mv | 1500 | 13 188 | 3.8 | no streaks or specks | approved |
| 4 | ZSK 43 Mv | 700 | 6154 | 8.1 | few streaks, no specks | just approved |
| Comparison | ZSK 43 Mv | 600 | 5275 | 9.4 | few streaks and specks | not approved |
| 6 | ZSK 43 Mv | 900 | 7912 | 6.3 | no streaks or specks | approved |
| 7 | ZSK 43 Mv | 750 | 6593 | 7.5 | few streaks, no specks | approved |

The experimental results show that tube quality with approval for extrusion processing was achieved in a system using two extruders arranged in series where the first extruder, the mixing assembly, had a high shear gradient at at least 6000 $s^{-1}$.

The invention claimed is:

1. A process for the continuous production of thermoplastically processable polyurethane elastomers comprising metering
   a polyisocyanate (A),
   a proportion of from 1 to 80 equivalent %, based on the isocyanate group content of the polyisocyanate (A), of a compound (B) having an average of at least 1.8 and at most 3.0 hydrogen atoms having Zerewitinoff activity, with an average molar mass of from 450 g/mol to 5000 g/mol,
   a proportion of from 12 to 99 equivalent %, based on the isocyanate group content of the polyisocyanate (A), of a chain extender (C) having an average of at least 1.8 and at most 3.0 hydrogen atoms having Zerewitinoff activity per molecule, with an average molar mass of from 60 g/mol to 400 g/mol, and
   from 0 to 30% by weight, based on the total amount of the polyurethane elastomer, of catalysts and further auxiliaries and additives (D), the molar NCO:OH ratio of polyisocyanate (A) to the entirety composed of said compound (B), of the chain extender (C), and of the further auxiliaries and additives (D) being from 0.9:1 to 1.2:1 into a self-cleaning twin-screw extruder whose external screw diameter is in the range of from 32 to 62 mm, which is operated at shear rates above $6000s^{-1}$ to $13188s^{-1}$ and residence times in the range from 1 to 20 s, and then bringing the mixture from the self-cleaning twin-screw extruder into a second apparatus in order to complete the reaction, wherein said second apparatus is different and separate from the self-cleaning twin-screw extruder.

2. The process according to claim 1, wherein said second apparatus is a twin-screw extruder with shear rates below the shear rates of the self-cleaning twin-screw extruder, and said second apparatus has an external screw diameter larger than that of the self-cleaning twin-screw extruder.

3. The process according to claim 1, wherein said second apparatus is a continuously revolving, heatable conveyer belt.

4. The process according to claim 1, wherein the polyisocyanate (A) is a substance or a mixture of substances selected from the group consisting of diphenylmethane 4,4'-diisocyanate with at least 97% 4,4'-isomer content, hexamethylene 1,6-diisocyanate, dicyclohexylmethane diisocyanate, and isophorone diisocyanate.

5. The process according to claim 1, wherein the compound (B) comprising the hydrogen atoms having Zerewitinoff activity is a substance or a mixture of substances selected from the group consisting of polyesterols, polyetherols, and polycarbonatediols.

6. The process according to claim 1, wherein the chain extender (C) is a substance or a mixture of substances selected from the group consisting of ethanediol, propanediol, 1,4-butanediol, 1,6-hexanediol, and 1,4-di(β-hydroxyethyl)hydroquinone.

7. The process according to claim 1, wherein the polyisocyanate (A), the compound (B), the chain extender (C), and, optionally, the catalysts and the further auxiliaries and additives (D) are metered together into a first feed section of the self-cleaning twin-screw extruder operated with shear rates above $6000s^{-1}$.

8. The process according to claim 1, wherein said compound (B) and the chain extender (C) are premixed prior to metering into the feed section of the self-cleaning twin-screw extruder operated with shear rates above $6000s^{-1}$.

9. The process according to claim 8, wherein said compound (B) and the chain extender (C) are premixed prior to metering into the feed section of the self-cleaning twin-screw extruder operated with shear rates above $6000s^{-1}$, and by means of a static mixer or of a mixing head operated by the dynamic mixing principle.

10. The process according to claim 1, wherein the polyisocyanate (A) and the compound (B) are metered into a first feed section of the self-cleaning twin-screw extruder operated with shear rates above $6000s^{-1}$, and the chain extender (C) is metered into a further feed section situated downstream in the self-cleaning twin-screw extruder.

11. The process according to claim 1, wherein the L/D ratio of the self-cleaning twin-screw extruder operated with shear rates above $6000s^{-1}$ is at least 8.

12. The process according to claim 1, wherein mixing sections occupy from 5/100 to 25/100 of the entire length of the extruder screw in the self-cleaning twin-screw extruder operated with shear rates above $6000s^{-1}$.

13. A method of producing an injection-molded part or an extruded item comprising injecting into a mold or extruding one or more thermoplastic polyurethane elastomers obtained by the process according to claim 1.

14. The process according to claim 1, wherein the second apparatus is operated at shear rates of from $800s^{-1}$ to $3200s^{-1}$.

15. The process according to claim 1, wherein the operating temperature of the second apparatus is lower than the operating temperature of the self-cleaning twin-screw extruder.

16. The process according to claim 15, wherein the operating temperature of the second apparatus is 200° C. or less.

17. The process according to claim 1, wherein the self-cleaning twin-screw extruder does not contain kneading elements.

* * * * *